United States Patent
Beck et al.

(10) Patent No.: US 9,148,003 B2
(45) Date of Patent: Sep. 29, 2015

(54) HOUSING, IN PARTICULAR FOR AN ELECTRIC VEHICLE CHARGING BOX

(75) Inventors: Bernhard Beck, Volkach OT Dimbach (DE); Sebastian Bachmann, Kassel (DE); Ge Xiong, Kassel (DE)

(73) Assignee: Adensis GmbH, Dresden (DE)

( * ) Notice: Subject to any disclaimer, the term of this patent is extended or adjusted under 35 U.S.C. 154(b) by 1167 days.

(21) Appl. No.: 13/099,872

(22) Filed: May 3, 2011

(65) Prior Publication Data

US 2011/0290700 A1 Dec. 1, 2011

(30) Foreign Application Priority Data

May 3, 2010 (DE) .......................... 10 2010 019 143

(51) Int. Cl.
*H02G 3/08* (2006.01)
*B60L 11/18* (2006.01)
*H02G 3/04* (2006.01)

(52) U.S. Cl.
CPC ............ *H02G 3/081* (2013.01); *B60L 11/1816* (2013.01); *B60L 11/1824* (2013.01); *B60L 11/1825* (2013.01); *H02G 3/0493* (2013.01); *Y02T 10/7005* (2013.01); *Y02T 90/121* (2013.01); *Y02T 90/128* (2013.01); *Y02T 90/14* (2013.01)

(58) Field of Classification Search
CPC .. H02G 3/081; H02G 3/0493; B60L 11/1824; B60L 11/1825; B60L 11/1816; Y02T 90/128; Y02T 10/7005; Y02T 90/14; Y02T 90/121

USPC ......... 361/645, 673, 622, 660, 242, 649, 654; 285/61, 134.1, 135.3, 154.1; 206/702, 206/703, 335

See application file for complete search history.

(56) References Cited

U.S. PATENT DOCUMENTS

| | | | |
|---|---|---|---|
| 3,753,047 A | | 8/1973 | Shallbetter |
| 4,993,963 A | * | 2/1991 | Pedigo .......................... 439/142 |
| 5,751,548 A | * | 5/1998 | Hall et al. ................. 361/679.41 |
| 6,459,234 B2 | * | 10/2002 | Kajiura .......................... 320/109 |
| 6,476,319 B1 | * | 11/2002 | Shemtov ........................ 174/659 |
| 7,432,439 B2 | * | 10/2008 | Takada et al. ..................... 174/50 |
| 7,504,580 B2 | * | 3/2009 | Lammens et al. .............. 174/50 |
| D628,960 S | * | 12/2010 | Shimizu et al. .............. D13/107 |
| 7,995,331 B2 | * | 8/2011 | Seitz et al. ............... 361/679.06 |
| 2010/0219729 A1 | * | 9/2010 | Huang ........................ 312/330.1 |
| 2011/0169447 A1 | * | 7/2011 | Brown et al. .................. 320/109 |

FOREIGN PATENT DOCUMENTS

| | | |
|---|---|---|
| DE | 1 294 296 | 4/1969 |
| DE | 69 34 971 U | 4/1970 |

(Continued)

*Primary Examiner* — Adrian S Wilson
*Assistant Examiner* — Abhishek Rathod
(74) *Attorney, Agent, or Firm* — Muncy, Geissler, Olds & Lowe, P.C.

(57) ABSTRACT

A housing having three side walls and a cover is provided, wherein an opening for introducing a pipe is formed in one of the side walls. The side walls are arranged in a U-shape, with the opening being provided in the side wall forming the first side thereof, and with a pipe section that aligns with the opening being connectable to the second side forming the opposite side wall thereof. The cross-section of the pipe section, in particular its diameter, is larger or smaller than the cross-section of the pipe. As a result, the pipe and the pipe section can be slid one inside the other.

10 Claims, 4 Drawing Sheets

(56) References Cited

FOREIGN PATENT DOCUMENTS

| DE | 84 24 199 U1 | 10/1984 |
| DE | 20 2009 010 127 U1 | 1/2010 |
| EP | 1 335 462 A2 | 8/2003 |
| EP | 2 028 580 A1 | 2/2009 |

* cited by examiner

HOUSING, IN PARTICULAR FOR AN ELECTRIC VEHICLE CHARGING BOX

This nonprovisional application claims priority under 35 U.S.C. §119(a) to German Patent Application No. DE 10 2010 019 143.4, which was filed in Germany on May 3, 2010, and which is herein incorporated by reference.

BACKGROUND OF THE INVENTION

1. Field of the Invention

The invention relates to a housing, in particular for a charging box for an electric vehicle, with three side walls, a floor, and a cover, wherein an opening for the introduction of a pipe is formed in a first side wall.

2. Description of the Background Art

Housings and implementations thereof are known. Depending on the application for the housing, important aspects include: design; costs, especially for mass production; functionality, such as accessibility of the interior; replaceability; and/or other aspects. In the case of a charging box for electric vehicles, virtually all of these aspects must be considered.

SUMMARY OF THE INVENTION

It is therefore an object of the invention to provide a housing with an appealing design that can be replaced in a simple way with another housing of identical design yet nevertheless permits economical manufacture with a small number of parts.

This object is attained according to an embodiment of the invention in that three of the side walls are arranged in a U-shape, with an opening provided in the side wall forming the first side thereof. Provided on the second side forming the opposite side wall thereof is a pipe section that aligns with the opening and has a cross-section, in particular its diameter, which is larger or smaller than the cross-section of a pipe. The pipe and the pipe section can be slid one inside the other, and can be locked in a telescoped state.

This procedure offers the advantage that, once the lock has been released, the housing and pipe section together can be removed easily from a guide and are available for any desired further use, such as for maintenance, repair, or replacement. It is particularly advantageous for a first part of an electrical plug connector aligned with the opening to be attached to the side wall opposite the first side wall.

In addition, it is advantageous for the pipe to have, at its free end, a counterpart to the first part of the plug connector and to have an adequate length. This makes it possible to establish a reliable plug connection between the two parts when the pipe is inserted through the opening. By this means, the plug connection is released at the same time as the pipe is withdrawn from the housing. However, it is also possible to employ a classic plug connector with plug and socket, each of which has an electrical supply line wired to it. The connector is then slid into the pipe, and does not hinder unimpeded removal of the housing from the pipe when the supply lines are of suitable length.

The housing part is further simplified when the fourth side wall is made up of a curved part of the outer housing or a part of the circumferential surface of the pipe. The housing shell then includes two parts: i) the U-shaped housing part with the three side surfaces and ii) the outer housing with the integrated fourth side surface. The outer housing can be fabricated from a polycarbonate, while the U-shaped housing part can be made of a rust-proofed or non-rusting material. The three side walls forming the U-shaped housing part can be a one-piece sheet metal part that is rounded at its corners or edges. Without the rounding, and in particular in combination with the rounding, an especially distinctive design results when the opening is located in the upper third or quarter of the first side wall. This results in an overall pedestal-like appearance for the electric charging station, offering a high recognition value.

The use of the housing as an electric charging box is further simplified when the pipe is bent at an essentially right angle and, in particular, in an L shape. This produces two pipe sections of unequal lengths, of which the short pipe section is inserted through the opening, while the end of the long pipe section is fastened to the ground. The lengths of the long and short pipe sections can be, in an exemplary embodiment, approximately 150 cm and 45 cm. In order to achieve a fixed inclination of the housing cover to the ground, the short pipe section has on its circumferential surface an elongated protrusion extending parallel to the center axis of the pipe that is matched in an interlocking manner to a recess at the edge of the opening. In this way, rotation is prevented, since the combination of the recess and the protrusion provides a type of catch that accommodates or absorbs a torque.

This catch can be extended to a guide rail if the recess represents the start of a groove that is formed by a profiled strip adjoining the recess, the strip extending to the opposite side wall where it is connected thereto.

To ensure the intended function of the housing, it is advantageous for at least a first part of an additional plug connector to be mounted on at least one side wall. The housing is preferably equipped on its side surfaces (which is to say primarily also the floor or the cover) with the sockets or plugs of two or four additional plug connectors. The additional plug connectors initially include parts of conventional plug connections or power outlets or plugs (230V or 360V) and are mounted behind additional recesses on the housing so as to be freely accessible from the outside.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
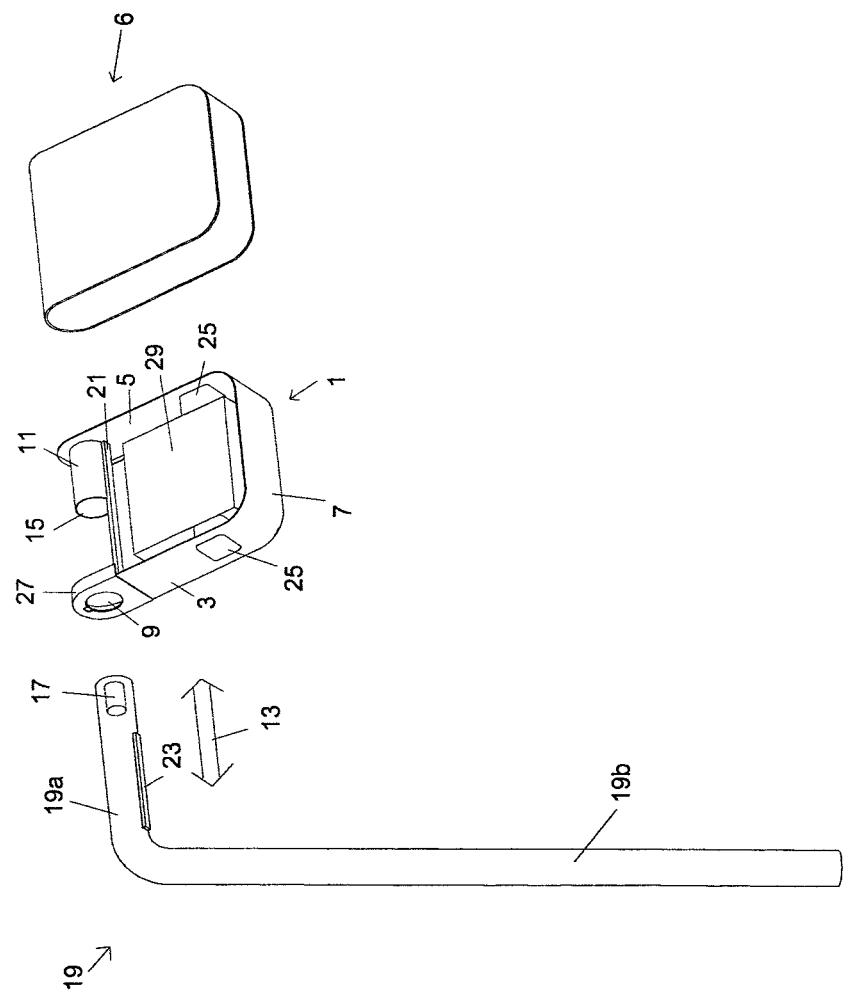
FIG. 1 is a perspective view of the assembly of an inventive housing and a pipe with a guide rail.

Corresponding parts are labeled with the same reference characters in all figures.

FIG. 1 shows a U-shaped housing part 1 for a charging box of an electric vehicle, which has a first side piece or side wall 3 and a second side piece or side wall 5, as well as a base side or base side wall 7. A circular opening 9 is provided in one of the side pieces 3. The diameter of the opening 9 is matched to the outside diameter of a pipe 19 so that the pipe 19 can be inserted into the interior region of the U-shaped housing part 1 from the outside. The pipe 19 has a first pipe section 19a and a second pipe section 19b.

The pipe 19 or its pipe section 19a is provided at its connector end with a connector socket 17, which is designed to form a counterpart to the connector plug 15 in a pipe section 11 located on the side piece 5. In order to ensure proper positioning and orientation of the connector socket 17 and plug 15, a grooved or profiled rail 21 is provided in the housing 1 and a guide rail 23 is provided on the pipe 19. As a result, the housing 1 can be installed and removed along the arrow 13.

The pipe 19 has a short pipe section 19a, on which is provided a convexity in the form of a guide rail 23, which extends in the direction of the longitudinal axis of the pipe section 19a. The dimensions, which is to say the width and the height, of the profiled rail 21 are matched to the dimensions of a recess 31 (FIG. 3), which extends into the side wall 3 from the periphery of the opening 9. The profiled rail 21 or the recess 31 achieves, in conjunction with the rail 23, anti-rotation protection between the pipe 11 and the U-shaped housing part 1. The recess 31 is adjoined by the profiled strip or profiled rail 21, which forms a channel 35 implemented as a groove (FIG. 3), in which the guide rail 23 can slide. The profiled rail 21 is rigidly attached to the two sides 3, 5 of the U-shaped housing part 1, thus simultaneously serving as a reinforcement.

Figure 3:
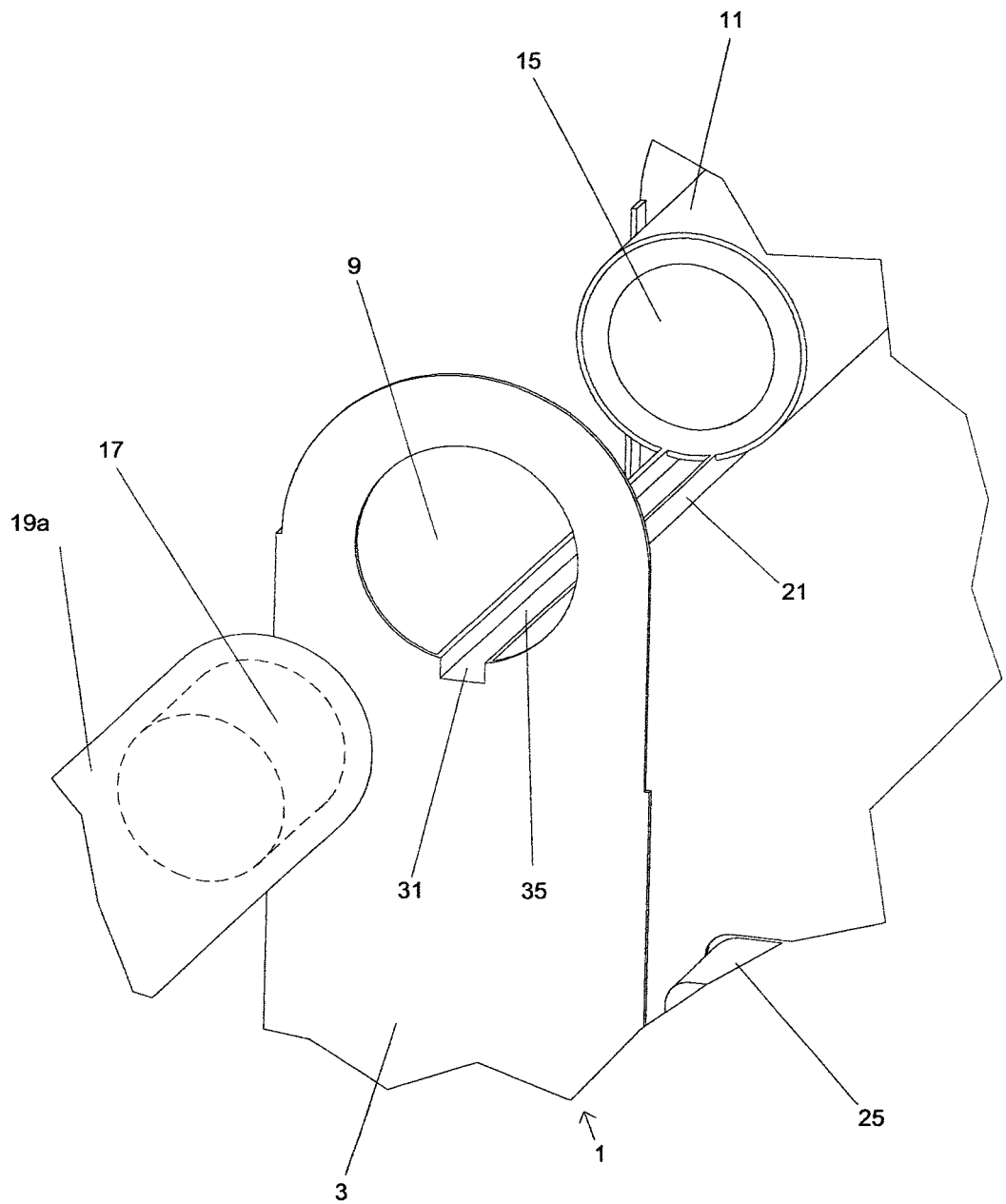
FIG. 3 is a detail view of the guide rail from FIG. 1 in a larger scale.

The profiled rail 21, the pipe section 19a, and the recess 31 are shown in an enlarged view in FIG. 3. In the detail view in FIG. 3, the profiled rail 21 is comparatively clearly visible. It is evident that the recess 31 transitions into the channel 35, implemented as a groove, of the profiled rail 21 in order to ensure sliding of the guide rail 23.

Also provided in the housing 1 is a component box 29. This box protects electrical components located therein from the effects of weather. Associated with the component box 29 are connector plugs 25, which are attached to one of the side pieces 3, 5 or to a cover 6.

Figure 2:
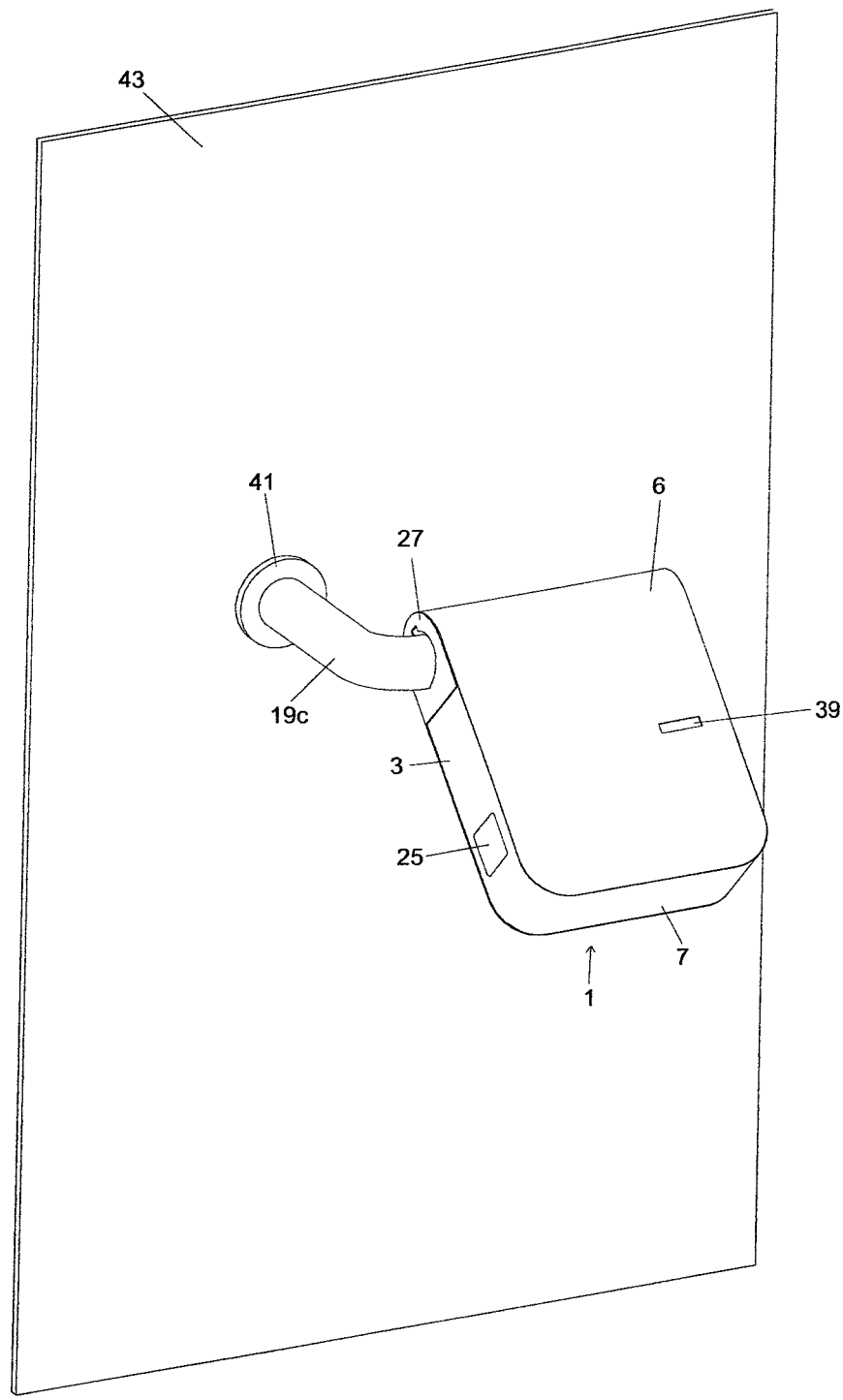
FIG. 2 illustrates a wall mounting of the housing as an alternative embodiment.

Shown in FIG. 2 is a wall-mounting technique by means of a pipe section 19c, which is attached to a wall 43 by means of a wall attachment plate or mounting plate 41. Also shown in FIG. 2 is the cover 6 with integrated display 39.

Figure 4:
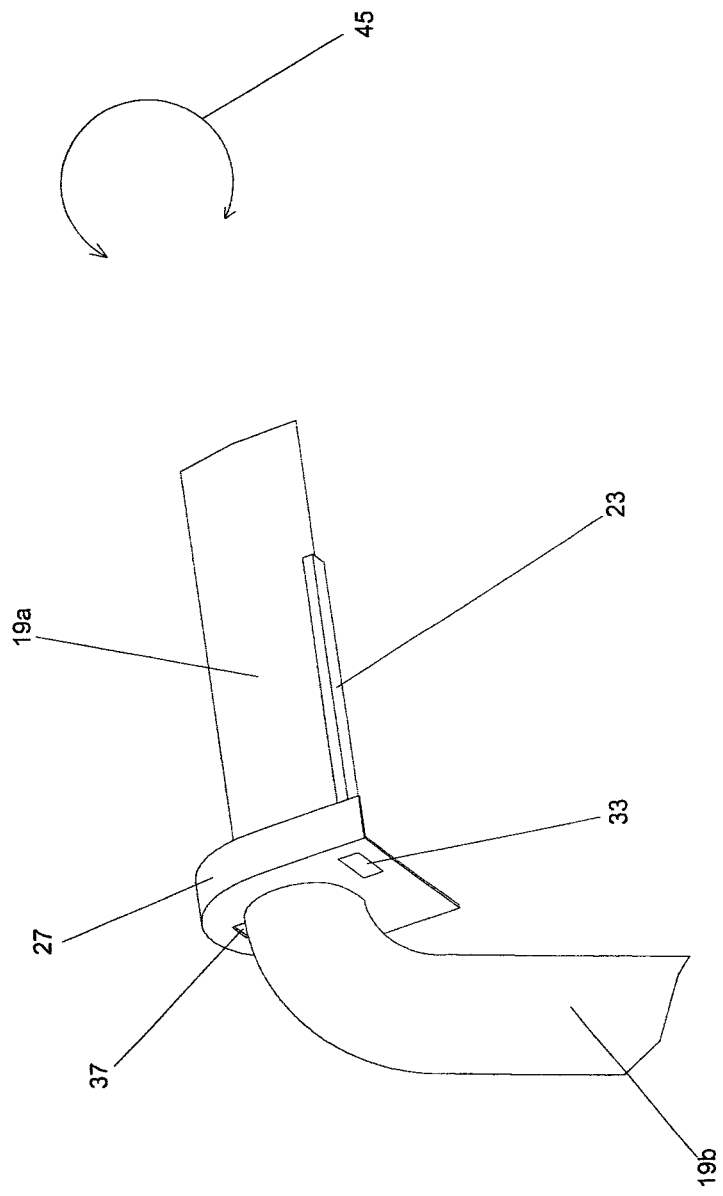
FIG. 4 is a detail view of a locking arrangement with a retainer.

FIG. 4 shows a detail view regarding locking of the housing 1, wherein the housing is omitted in FIG. 4. A retainer 27, which has a retaining groove 37, is pushed over the pipe section 19a and the guide rail 23 with the groove 37 downward. Once the retainer 27 has passed the guide rail 23, the retainer 27 is rotated by 180 degrees in the direction of the arrow 45. Then the housing 1 can be pushed over the pipe 11 and secured with a lock 33.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing comprising:
   a first, second and third side walls arranged in a U-shape, with the first and second side walls being substantially parallel to one another;
   a cover;
   a through hole formed in the first side wall, the through hole configured to allow a pipe to pass therethrough; and
   a pipe section arranged on the second side wall, the pipe section being arranged such that an opening of the pipe section is aligned with the through hole,
   wherein a cross-section of the pipe section is larger or smaller than a cross-section of the pipe,
   wherein the pipe and the pipe section are configured to be slid onto one another and configured to be locked in a telescoped state,
   wherein the through hole is entirely surrounded by the first side wall, and
   wherein the pipe is bent at an essentially right angle and two pipe sections of unequal lengths are produced, of which the short pipe section is inserted through the through hole and the end of the long pipe section is fastened to the ground or a wall.

2. The housing according to claim 1, wherein the housing accommodates at least the following parts: at least one socket, one jack, or one plug, a display attached to the cover, and/or an inner housing for protecting electrical components.

3. The housing according to claim 1, wherein the third side wall is composed of a curved part of the cover or a part of the circumferential surface of the pipe.

4. The housing according to claim 1, wherein the pipe is round and has on its circumferential surface an elongated protrusion extending substantially parallel to the center axis of the pipe that is matched in an interlocking manner to a recess at the edge of the through hole.

5. The housing according to claim 4, wherein the recess represents a start of a groove that is formed by a profiled rail adjoining the recess and extending towards the opposite side wall where it is connected thereto.

6. The housing according to claim 1, wherein at least the three side walls are formed of a one-piece sheet metal part that is rounded at its corners or edges.

7. The housing according to claim 1, wherein at least a first part of an additional plug connector is mounted on at least one additional side wall.

8. The housing according to claim 1, wherein the through hole is located in an upper third portion of the first side wall.

9. The housing according to claim 1, wherein the pipe section inwardly protrudes from the second side wall towards the first side wall.

10. The housing according to claim 1, wherein the first, second and third side walls are integrally formed.

* * * * *